United States Patent

Naka et al.

[11] Patent Number: 6,117,400
[45] Date of Patent: Sep. 12, 2000

[54] HC EMISSION CONTROL MEMBER FOR EXHAUST GAS

[75] Inventors: Takahiro Naka; Tetsuo Endo; Haruhiko Shimizu; Shinichi Kikuchi; Mitsuo Wakabayashi, all of Wako, Japan

[73] Assignee: Honda Giken Kogyo Kabushiki Kaisha, Tokyo, Japan

[21] Appl. No.: 09/041,102

[22] Filed: Mar. 12, 1998

[30] Foreign Application Priority Data

Jun. 3, 1997 [JP] Japan ................................. 9-145538

[51] Int. Cl.⁷ .............................. B01D 53/34; B01J 20/02
[52] U.S. Cl. ...................... 422/180; 422/171; 422/177; 502/61; 502/64; 502/73; 502/235; 502/407
[58] Field of Search ..................... 422/171, 177, 422/180; 502/61–63, 64, 71, 232–235, 355, 407, 73

[56] References Cited

U.S. PATENT DOCUMENTS

| | | | |
|---|---|---|---|
| 5,125,231 | 6/1992 | Patil et al. | 422/171 |
| 5,306,684 | 4/1994 | Itoh et al. | 502/61 |
| 5,447,694 | 9/1995 | Swaroop et al. | 422/171 |
| 5,525,307 | 6/1996 | Yasaki et al. | 422/171 |
| 5,741,948 | 4/1998 | Kirishiki et al. | 502/71 |

FOREIGN PATENT DOCUMENTS 2-56247  2/1990  Japan.

Primary Examiner—Hien Tran
Attorney, Agent, or Firm—Arent Fox Kintner Plotkin & Kahn, PLLC

[57] ABSTRACT

An HC emission control member includes an HC adsorbing layer on a carrier and an HC oxidizing layer on the HC adsorbing layer. The hydrophobic property of the HC adsorbing layer is enhanced, so that satisfactory adsorption and desorption of HC could be obtained.

7 Claims, 7 Drawing Sheets

HC EMISSION CONTROL MEMBER FOR EXHAUST GAS

BACKGROUND OF THE INVENTION

1. Field of the Invention

The present invention relates to an HC (hydrocarbon) emission control member for an exhaust gas, which is used in an exhaust system in an automobile or the like, and particularly, to an improvement in an HC emission control member for an exhaust gas comprising an HC adsorbing layer on a carrier and an HC oxidizing layer on the HC adsorbing layer.

2. Description of Prior Art

There are conventionally known exhaust emission control catalysts of various configurations used in automobile exhaust systems. However, a common exhaust emission control catalyst is able to purify an exhaust gas by oxidation only if the exhaust gas is at a high temperature, e.g., about 180° C. or more and hence, the catalyst has an extremely low ability to purify an exhaust gas, which includes hydrocarbon (HC) at a high concentration, having a low temperature immediately after the start of an engine.

An HC emission control member, which is conventionally known, comprises an HC adsorbing layer made of an aluminosilicate (zeolite) to catch HC in an exhaust gas having a low temperature (for example, see Japanese Patent Application Laid-open No. 2-56247).

However, the aluminosilicate adsorbs water along with HC in the exhaust gas and the water adsorption reduces the HC adsorbing ability of the aluminosilicate. When the aluminosilicate desorbs HC, the adsorbed water is also desorbed. For this reason, it is difficult to raise the temperature of the HC oxidizing layer to a temperature enough to activate the HC oxidizing layer due to the heat of vaporization produced by water evaporation. As a result, the conventional HC emission control member could not satisfactorily adsorb and desorb HC.

SUMMARY OF THE INVENTION

It is an object of the present invention to provide an HC emission control member of the above-described type, wherein the hydrophobic property of the HC adsorbing layer can be enhanced, so that satisfactory adsorption and desorption of HC could be obtained.

To achieve the above object, according to the present invention, there is provided an HC emission control member for an exhaust gas, which comprises an HC adsorbing layer on a carrier, and an HC oxidizing layer on the HC adsorbing layer, wherein the HC adsorbing layer is made of a metallo-silicate having an Al content of $\leq 0.05\%$ by weight.

Being more hydrophobic due to the low content of Al, the metallo-silicate has a low water-adsorbing property. Thus, the HC adsorbing layer preferentially and sufficiently adsorbs HC, so that sufficient physical adsorption is produced. On the other hand, the adsorbed HC is desorbed with an increase in temperature of the exhaust gas, and when the HC is desorbed, the amount of water desorbed is small. Therefore, there is no inhibition of temperature increases in the HC oxidizing layer. As a result, there will be satisfactory chemical conversion of the desorbed HC.

However, if the Al content is higher than 0.05% by weight, the hydrophobic property of the metallo-silicate is reduced. It is desirable for enhancing the hydrophobic property of the metallo-silicate that the Al content is zero, but in the preparation of the metallo-silicate, it is difficult to suppress the Al content to zero because of impurities in the starting material. Therefore, a lower limit of the Al content is a value assymptotic to zero.

DETAILED DESCRIPTION OF THE INVENTION

Figure 1:
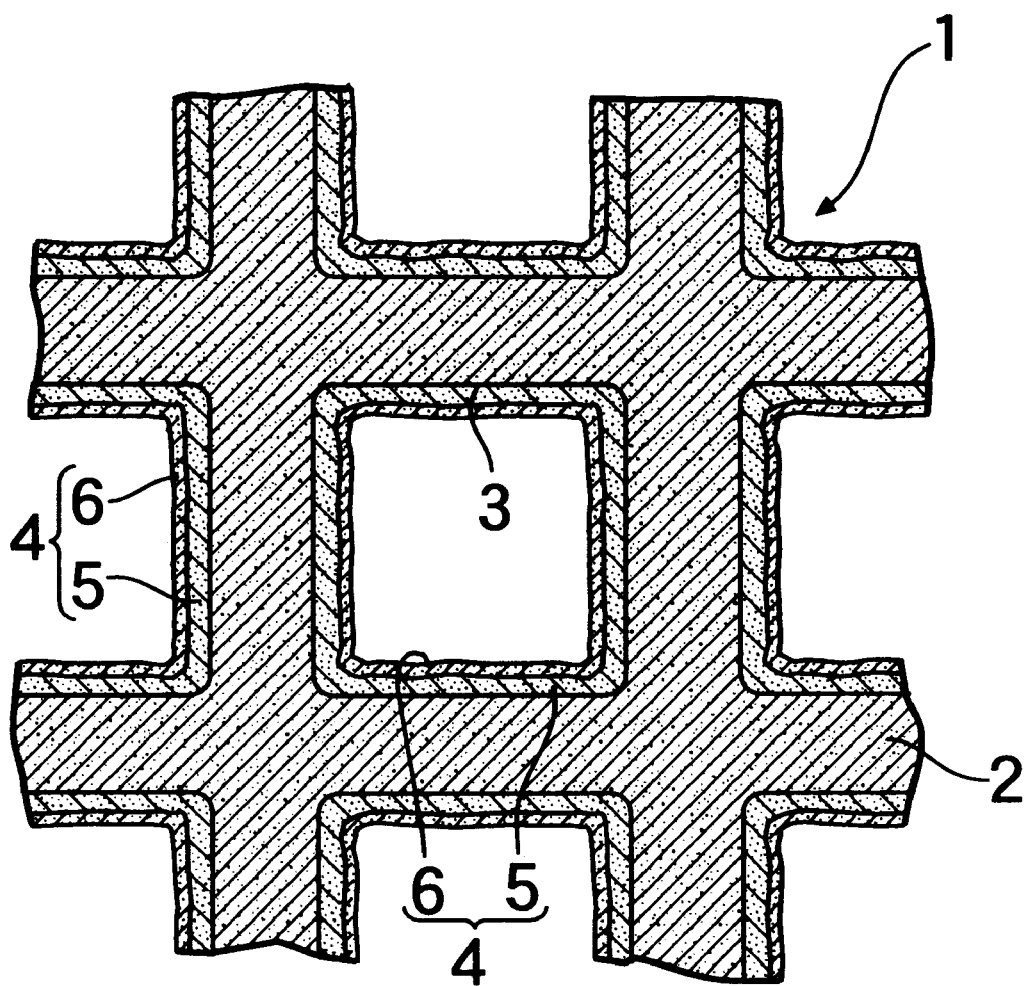
FIG. 1 is a sectional view of an essential portion of an HC emission control member.

In FIG. 1, an HC emission control member 1 is comprised of a cordierite honeycomb 2 as a carrier, and an HC converting laminate 4 provided on an inner surface of each of cells 3 of the honeycomb 2. The laminate 4 includes an HC adsorbing layer 5 on the inner surface of the cell 3, and a porous HC oxidizing layer 6 on an inner surface of the HC adsorbing layer 5.

The HC adsorbing layer 5 is made of a metallo-silicate having an Al content of $\leq 0.05\%$ by weight. The metallo-silicate may be an MFI type metallo-silicate comprising at least one of Ga and In as a skeleton forming element.

The HC oxidizing layer 6 comprises at least one of Pd, Pt and Rh as a catalyst element, and may comprise an oxide of Ce, Zr, La, Ba or the like as a co-catalyst.

The reason why the HC adsorbing layer 5 is situated beneath the inner surface of the carrier is that the rise in temperature of the HC adsorbing layer 5 caused by the exhaust gas can be inhibited so that the HC adsorbing layer 5 can exhibit sufficient HC adsorbing abilities. On the other hand, the reason why the HC oxidizing layer 6 is situated on the inner surface of the carrier is that the rise in temperature of the HC oxidizing layer 6 caused by the exhaust gas can be facilitated so that the HC oxidizing layer 6 can exhibit sufficient HC oxidizing abilities.

Examples will be described below.

I-1. Production of MFI gallium-silicate (1) 0.4 kg Of TPA-Br (tetrapropylammonium bromide, a template agent) and 5 kg of pure water were added to 6.5 kg of commercially available colloidal silica (including 30% by weight of $SiO_2$ and 0.4% by weight of $Na_2O$) to prepare 11.9 kg of a first starting material.

(2) 0.3 kg of sodium hydroxide and 8 kg of pure water were added to 0.08 kg of gallium chloride ($GaCl_3$ with a purity of 99.999%) to prepare 8.38 kg of a second starting material.

(3) The first starting material was placed into a container made of a stainless steel, and the second starting material was gradually added to the first starting material, while the first starting material was being stirred.

(4) The mixture of the first and second starting materials was stirred for 30 minutes to provide a gallium silicate alkali gel which was uniform all over. The composition of the alkali gel was as follows: Molar ratio of $SiO_2/Ga_2O_3=750$; molar ratio of $Na_2O/SiO_2=0.133$; molar ratio of $H_2O/Na_2O=226$; and molar ratio of $TPA-Br/SiO_2=0.05$.

(5) The alkali gel was thrown into an autoclave and maintained at 170° C. for 24 hours with stirring for crystallization, thereby providing a slurry of crystals.

(6) The slurry of crystals was subjected to a solid-liquid separation treatment to provide a solid component, which was washed and then filtered to provide a cake.

(7) The cake was dried at 110° C. for 24 hours and then calcined at 550° C. for 12 hours using an electric oven. Thereafter, the calcined material was pulverized to provide about 1.3 kg of a powdery MFI gallium silicate.

The content of Ga in the MFI gallium silicate was equal to 0.4% by weight, and the content of Al was equal to 0.04% by weight. The aluminum is believed to be incorporated in the commercially available colloidal silica.

I-2. Production of MFI Indium Silicate

About 1.3 kg of a powdery MFI indium silicate was produced in the same manner as in Example I-1, except that indium chloride ($InCl_3$ with a purity of 99.999%) was used in place of gallium chloride.

In this case, the composition of the indium silicate alkali gel was as follows: Molar ratio of $SiO_2/In_2O_3=750$; molar ratio of $Na_2O/SiO_2=0.133$; molar ratio of $H_2O/Na_2O=226$; and molar ratio of $TPA-Br/SiO_2=0.05$. The content of In in the MFI indium silicate was equal to 0.6% by weight, and the content of Al was equal to 0.04% by weight.

I-3. Production of MFI Aluminosilicate

About 1.3 kg of a powdery MFI aluminosilicate (ZSM-5 zeolite) was produced in the same manner as in Example I-1, except that sodium aluminate (comprising 52.7% by weight of $Al_2O_3$ and 41.9% by weight of $Na_2O$) was used in place of gallium chloride.

In this case, the composition of the aluminosilicate alkali gel was as follows: Molar ratio of $SiO_2/Al_2O_3=750$; molar ratio of $Na_2O/SiO_2=0.133$; molar ratio of $H_2O/Na_2O=226$; and molar ratio of $TPA-Br/SiO_2=0.05$. The content Al in the MFI aluminosilicate was equal to 0.2% by weight.

I-4. Content of Al

Various MFI gallium silicates having different Al contents were produced in the same manner as in the production of the MFI gallium silicate described in Example I-1, except that alumina was added in varied amounts to the alkali gel.

Figure 2:
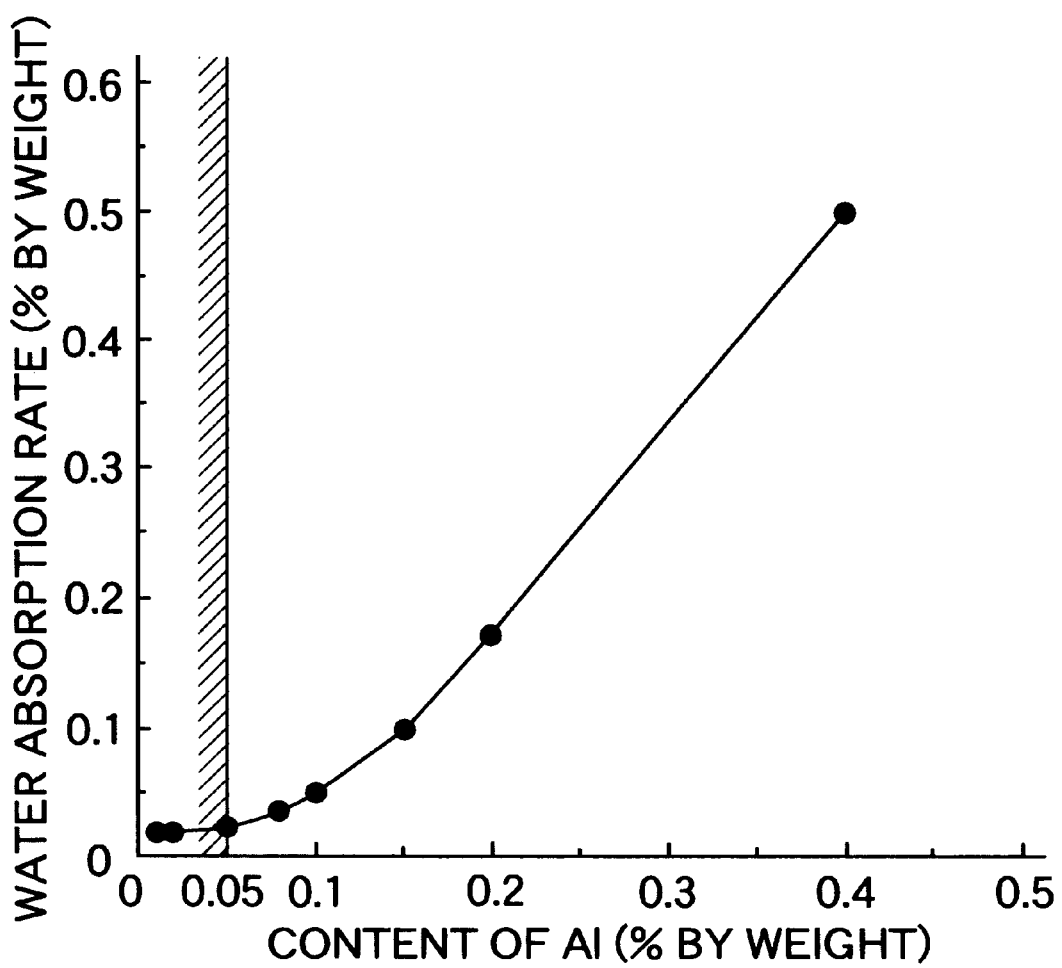
FIG. 2 is a graph illustrating the relationship between the content of Al and the water adsorption rate.

Each of the MFI gallium silicates was left to stand for 70 hours in an atmosphere having a temperature of 40° C. and a humidity of 90%. Then the relationship between the content of Al in the MFI gallium silicate and the water absorbing rate was examined, thereby providing results shown in FIG. 2. It can be seen from FIG. 2 that if the content of Al is ≦0.05% by weight, the hydrophobic property of the MFI gallium silicate is largely enhanced.

I-5. HC Desorbing Characteristic

The MFI gallium silicate, the MFI indium silicate and the MFI aluminosilicate were heated at 500° C. for 5 hours in air.

The following two atmospheres were prepared: a first atmosphere consisting of 100 ppm of $C_7H_{14}$ and the balance $N_2$ and containing no water and a second atmosphere consisting of 100 ppm of $C_7H_{14}$, 10% by volume of $H_2$ and the balance $N_2$ and water. The MFI gallium silicate, the MFI type indium silicate and the MFI aluminosilicate were left to stand for 20 hours in the first atmosphere, thereby permitting $C_7H_{14}$ to be adsorbed to the silicates in a water-free condition. At the same time, the three silicates were likewise left to stand for 20 hours in the second atmosphere, thereby permitting $C_7H_{14}$ to be adsorbed to the silicates in a water-containing condition.

Figure 3:
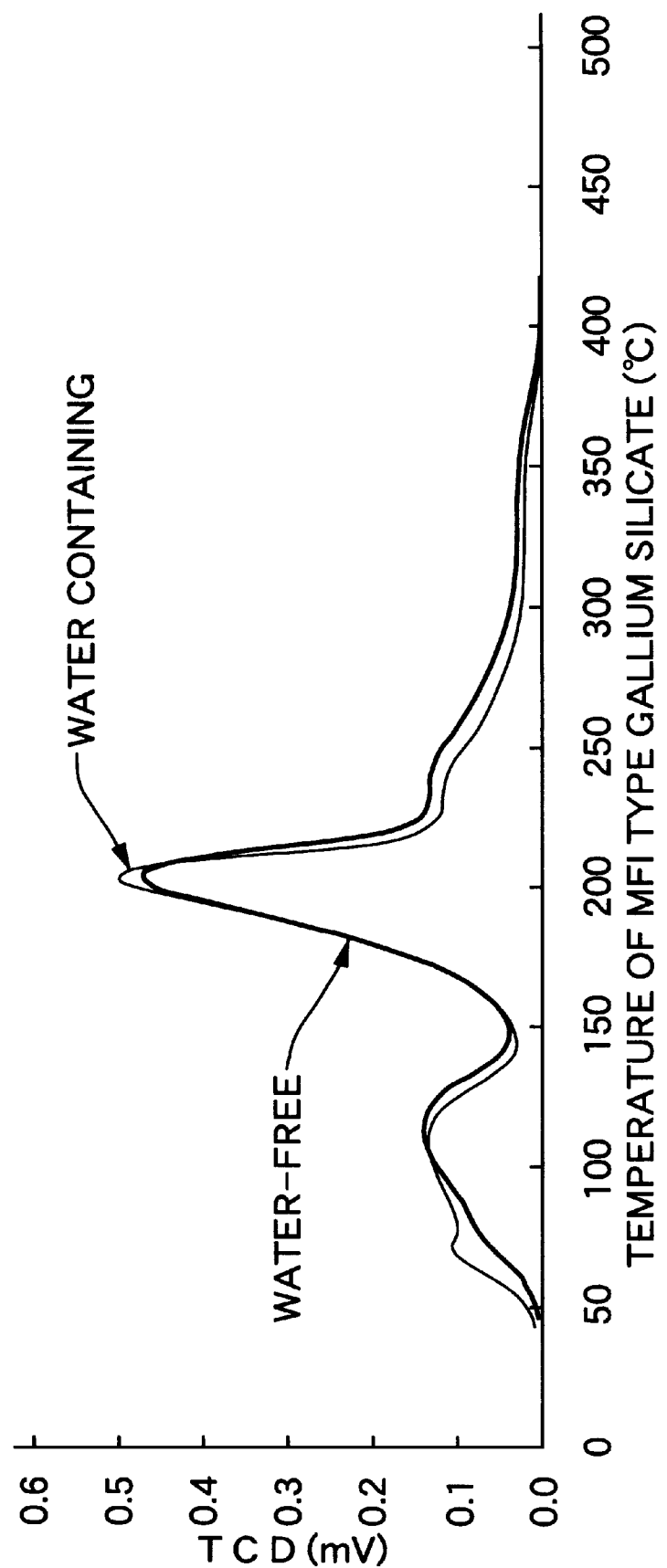
FIG. 3 is a graph illustrating the first example of the result of a TPD analysis.
Figure 4:
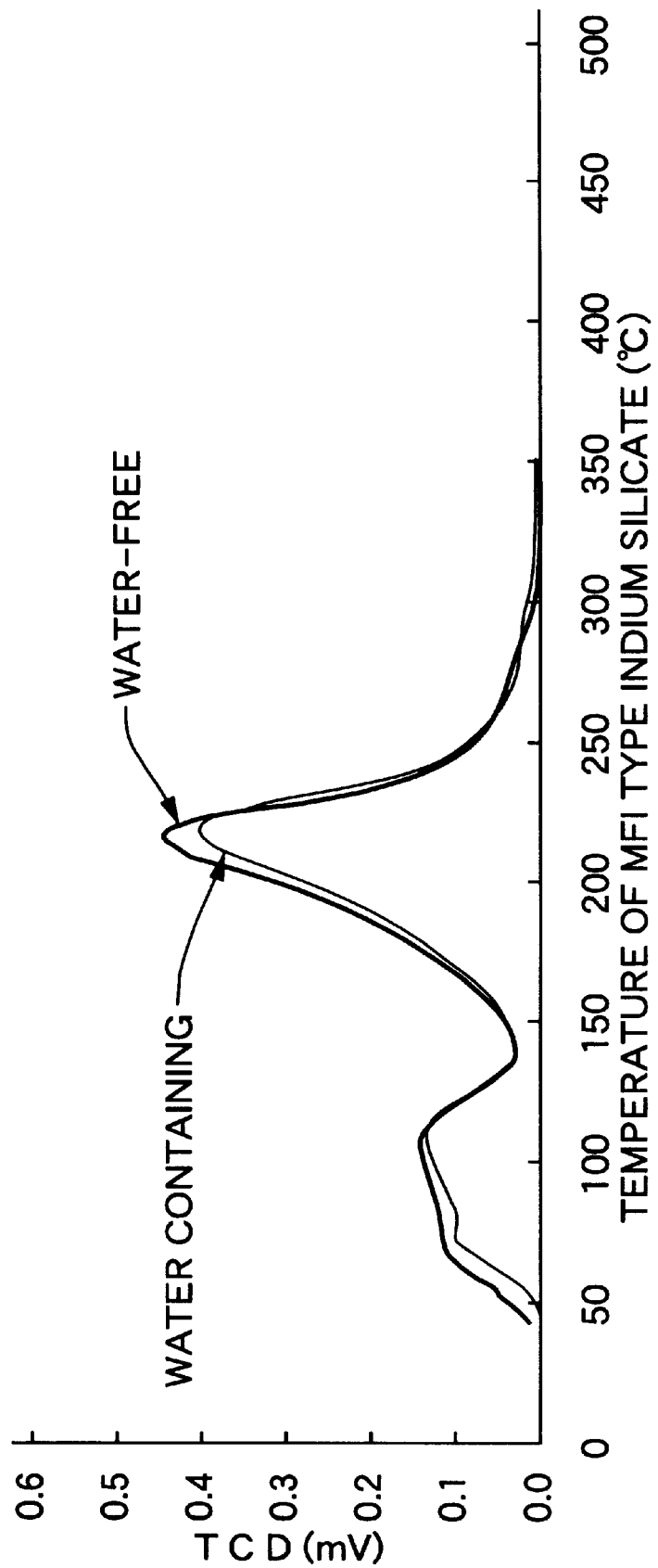
FIG. 4 is a graph illustrating the second example of the result of the TPD analysis.
Figure 5:
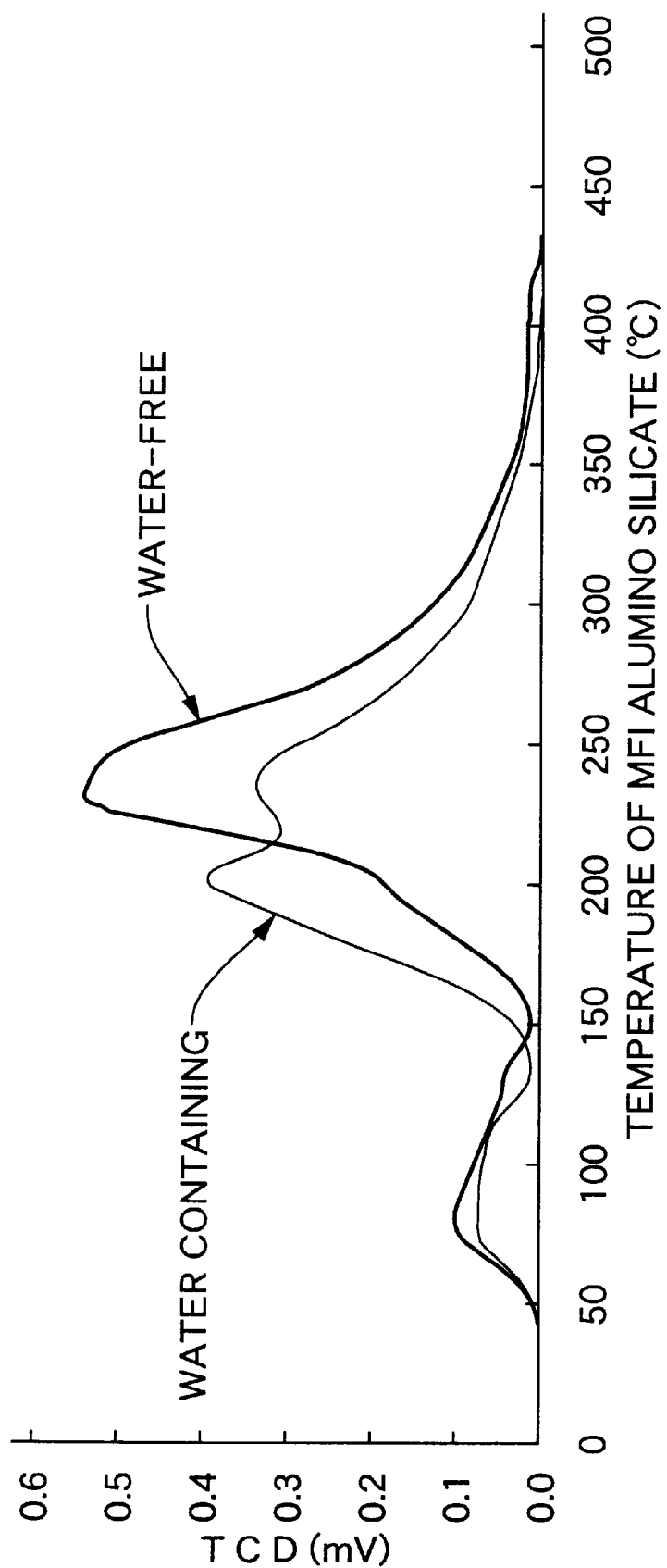
FIG. 5 is a graph illustrating the third example of the result of the TPD analysis.

Thereafter, each of the silicates was subjected to a TPD (Thermo Programmed Detector) analysis at a He flow rate of 29 ml/min and a rate of silicate temperature increase equal to 5° C./min to examine the HC desorbing characteristic, thereby providing results shown in FIGS. 3 to 5.

As apparent from FIGS. 3 and 4, in the case of the MFI gallium silicate and the MFI indium silicate, the HC desorbing characteristic after HC adsorption carried out in the water-containing condition is substantially equivalent to and not varied from that after HC adsorption in the water-free condition, because these silicates have Al contents equal to or lower than 0.05% by weight and are quite hydrophobic. However, in the case of the MFI aluminosilicate, a relatively large difference is produced between the HC desorbing characteristics due to the presence or absence of water as shown in FIG. 5. This is due to the fact that the amount of HC adsorbed in the water-containing condition is small, as compared with that in the water-free condition, because the MFI aluminosilicate is less hydrophobic.

I-6. Relationship Between the HC Oxidizing Layer and Water

[A] Fabrication of HC Oxidizing Layer (1) γ-Alumina, palladium nitrate, $SiO_2$ sol and water were metered to provide a ratio of 10:3.3:0.7:30 by weight, and then mixed together. Then a predetermined amount of alumina balls were incorporated into the resulting mixture and, thereafter, the mixture was mixed and pulverized in a ball mill to provide a palladium slurry.

(2) A honeycomb made of cordierite was immersed into the palladium slurry, whereby the palladium slurry was deposited on inner surfaces of cells of the honeycomb.

(3) The palladium slurry was dried at room temperature and then, the honeycomb was placed into an electric oven, where it was calcined in air for one hour each at temperatures of 100° C., 200° C., 300° C. and 600° C. to provide an HC oxidizing layer 6 including Pd. In this case, the amount of Pd contained was 7.7 g/liter.

[B] HC Converting Ability of HC Oxidizing Layer

A test gas was prepared with varied amounts of water of 0, 10 and 20% by volume, as shown in Table 1.

TABLE 1

| Constituent | Test Gas Concentration |
|---|---|
| $O_2$ | 0.5% by volume |
| $CO_2$ | 14% by volume |
| CO | 0.5% by volume |
| $C_3H_6$ | 1200 ppmc |
| $H_2$ | 0.17% by volume |
| NO | 0.05% by volume |
| $H_2O$ | Varied Amounts (of 0, 10 or 20% by volume) |
| $N_2$ | Balance |

The test gas was allowed to flow through the honeycomb at a space velocity S.V. of 50,000h$^{-1}$, while at the same time, the temperature of the test gas was increased from ambient temperature to 300° C. The HC emission control rate during this time was measured, thereby providing results shown in FIG. 6.

Figure 6:
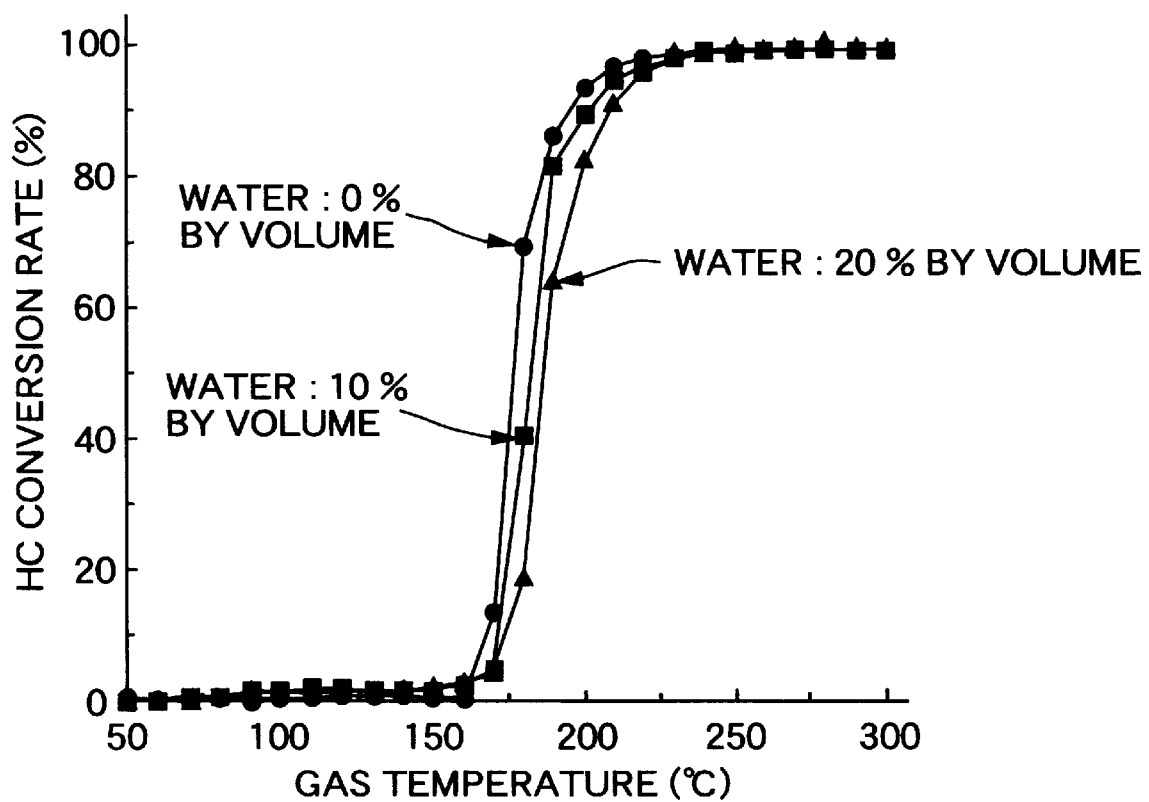
FIG. 6 is a graph illustrating the relationship between the gas temperature and the HC emission control rate.

As apparent from FIG. 6, if the amount of water in the test gas is increased, the HC emission control rate at the same gas temperature of about 175° C. to about 250° C. is decreased. From this fact, it can be seen that the activity of the HC oxidizing layer is influenced by water and is higher with a smaller amount of water.

II-1. Production of HC Emission Control Member

[A] Example (1) An MFI gallium silicate, $SiO_2$ sol and water were metered to provide a ratio of 10:1:10 by weight and mixed together. Then a predetermined amount of alumina balls were incorporated into the resulting mixture and, thereafter, the mixture was mixed and pulverized in a ball mill to provide a silicate slurry.

(2) A honeycomb 2 made of cordierite was immersed into the silicate slurry, whereby the silicate slurry was deposited onto inner surfaces of cells 3 of the honeycomb.

(3) The silicate slurry was dried at room temperature. Then, the honeycomb 2 was placed into an electric oven, where it was calcined in air for one hour each at temperatures of 100° C., 200° C., 300° C. and 600° C. to provide an HC adsorbing layer 5. In this case, the amount of HC adsorbing layer 5 obtained was 110 g/liter.

(4) The honeycomb 2 having the HC adsorbing layer 5 was immersed into a palladium slurry similar to that described in Example 1–6, whereby the palladium slurry was deposited onto the inner surface of the HC adsorbing layer 5 within each cell of the honeycomb.

(5) The palladium slurry was dried at room temperature and then the honeycomb was placed into an electric oven, where it was calcined in air for one hour each at temperatures of 100° C., 200° C., 300° C. and 600° C. to provide an HC oxidizing layer 6 including Pd. In this case, the amount of HC oxidizing layer 6 obtained was 57 g/liter.

[B] Comparative Example

An HC emission control member 1 was produced by carrying out an operation similar to that in Example [A], except that MFI aluminosilicate was used in place of the MFI gallium silicate. In this case, the amount of HC adsorbing layer 5 was 110 g/liter, and the amount of HC oxidizing layer 6 was 60 g/liter.

II-2. HC Emission Control Ability

The HC emission control member according to Example [A] was incorporated into an exhaust system of an engine (of a displacement of 2200 cc) to measure the HC emission control rate at the initial stage of the start of the engine. A similar measurement was also carried out using the HC emission control member 1 produced according to the comparative example, Example [B].

Figure 7:
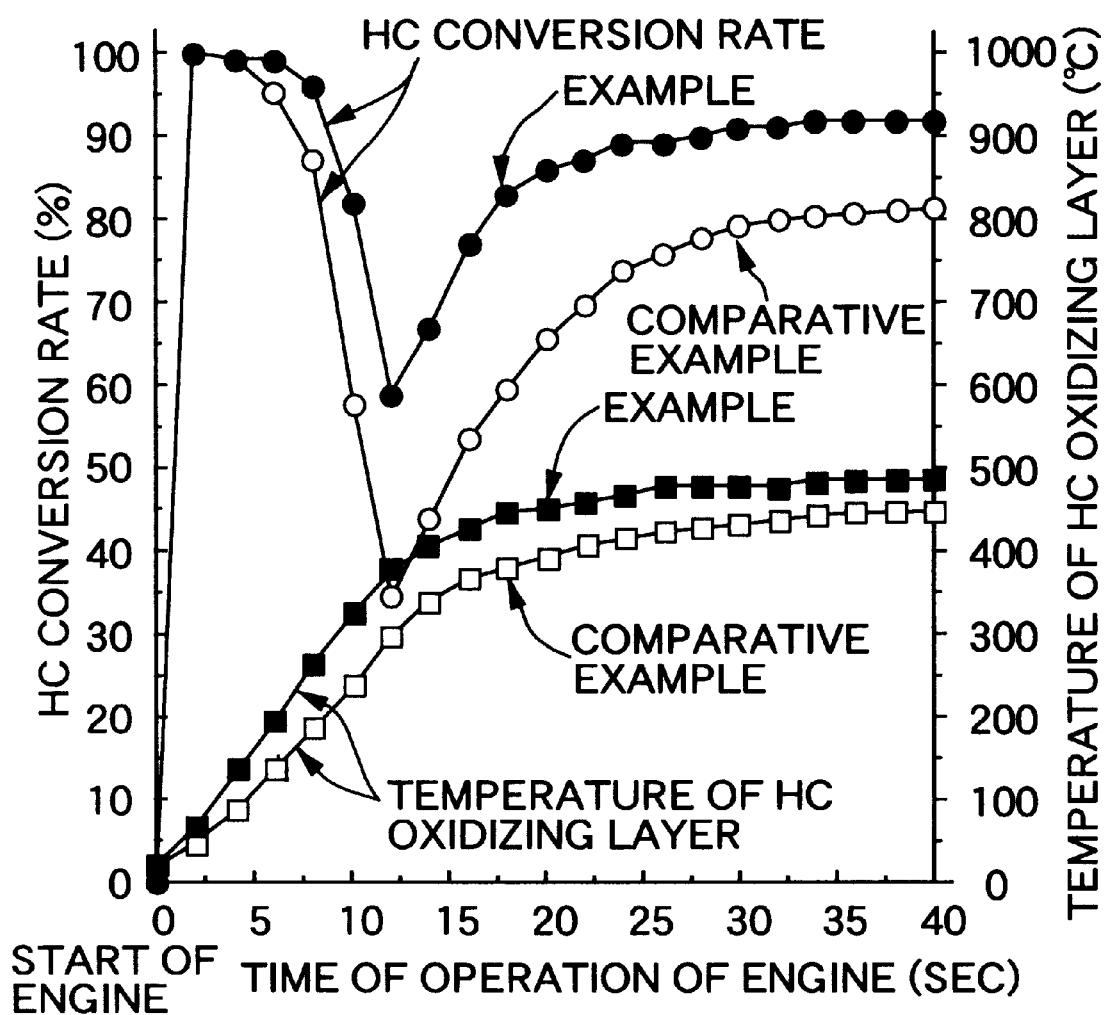
FIG. 7 is a graph illustrating the relationship between the time of operation of an engine, the HC emission control rate and the temperature of an HC oxidizing layer.

FIG. 7 shows the relationship between the operation duration of the engine, the HC emission control rate and the temperature of the HC oxidizing layer. In FIG. 7, a time point when the engine had been operated for 12 seconds was a transition point between physical adsorption and chemical conversion, and at this time point, the HC emission control rates of the HC emission control members according to Example [A] and the comparative example were lowest.

The lower limit value of the HC emission control rate of the HC emission control member according to Example [A] was about 60%. Thereafter, the HC emission control rate was rapidly increased with a rise in the temperature of the HC oxidizing layer 6. When the engine had been operated for 40 seconds, an HC emission control rate of 90% or more was obtained.

The lower limit value of the HC emission control rate of the HC emission control member according to the comparative example was as low as about 35%. Thereafter, the HC emission control rate showed a smaller increase, compared with the HC emission control member according to Example [A], with a rise in the temperature of the HC oxidizing layer. When the engine had been operated for 40 seconds, the HC emission control rate was only about 80%.

The reason why a difference was produced between HC emission control rates at the initial stage of the start of the engine in the HC emission control members according to Example [A] and the comparative example is that the HC adsorbing layer 5 in Example [A] was more hydrophobic than the HC adsorbing layer 5 in the comparative example.

In the MFI gallium silicate, the Ga content therein should be in a range of 0.01% by weight to $\leq 0.5\%$ by weight. If the Ga content is lower than 0.01% by weight, the crystallizability is poor. On the other hand, if the Ga content is >0.5% by weight, the molar ratio of $SiO_2/Ga_2O_3$ is decreased and hence, the selective adsorption performance for HC is reduced.

In the MFI indium silicate, the In content therein should be in a range of 0.01% by weight to $\leq 0.6\%$ by weight. If the In content is lower than 0.01% by weight, the degree of crystallization is low, resulting in an unstable structure. On the other hand, if the In content is >0.6% by weight, the molar ratio of $SiO_2/In_2O_3$ is decreased and hence, the selective adsorption performance for HC is reduced.

Finally, it should be noted that the MFI metallo-silicate may contain both Ga and In as skeleton forming elements.

We claim:

1. An HC emission control member for an exhaust gas, comprising an HC adsorbing layer on a carrier and an HC oxidizing layer on said HC adsorbing layer wherein said HC adsorbing layer is made of a metallo-silicate having an Al content of $\leq 0.05\%$ by weight.

2. The HC emission control member according to claim 1, wherein said metallo-silicate is an MFI metallo-silicate comprising at least one of Ga and In as a skeleton forming element.

3. The HC emission control member according to claim 2, wherein said metallo-silicate comprises Ga as a skeleton forming element.

4. The HC emission control members according to claim 2, wherein said metallo-silicate comprises In as a skeleton forming element.

5. The HC emission control member according to claim 1, wherein said carrier comprises a honeycomb made of cordierite.

6. The HC emission control member according to claim 1, wherein said HC oxidizing layer comprises at least one of Pd, Pt and Rh as a catalyst element.

7. The HC emission control member according to claim 2, wherein the MFI metallo-silicate comprises 30% by weight of $SiO_2$, 0.4% by weight of $Na_2O$, and gallium chloride, with a purity of 99.999%.

* * * * *